(12) United States Patent
Jonschker et al.

(10) Patent No.: US 6,403,164 B1
(45) Date of Patent: Jun. 11, 2002

(54) METHOD FOR PROTECTING A METALLIC SUBSTRATE AGAINST CORROSION

(75) Inventors: Gerhard Jonschker, Spiesen-Elversberg; Stefan Langenfeld, Wadgassen; Helmut Schmidt, Saarbruecken-Guedingen, all of (DE)

(73) Assignee: Institut für Neue Materialien gemeinnutzige GmbH, Saarbrucken (DE)

( * ) Notice: Subject to any disclaimer, the term of this patent is extended or adjusted under 35 U.S.C. 154(b) by 0 days.

(21) Appl. No.: 09/646,467
(22) PCT Filed: Mar. 26, 1999
(86) PCT No.: PCT/EP99/02065
§ 371 (c)(1),
(2), (4) Date: Sep. 18, 2000
(87) PCT Pub. No.: WO99/50477
PCT Pub. Date: Oct. 7, 1999

(30) Foreign Application Priority Data

Mar. 27, 1998 (DE) .......................................... 198 13 709

(51) Int. Cl.$^7$ ................................................. B05D 3/02
(52) U.S. Cl. ..................................... 427/387; 427/388.1
(58) Field of Search ................................ 427/388.1, 387

(56) References Cited

FOREIGN PATENT DOCUMENTS

| DE | 4205819 A1 | * | 9/1993 |
| EP | 610831 | * | 4/1994 |
| EP | 816454 | * | 1/1998 |
| GB | 1528715 | * | 10/1978 |
| JP | 60-166356 A2 | * | 8/1985 |
| JP | 02-238072 | * | 9/1990 |
| SU | 508980 | * | 2/1978 |
| WO | WO 88/03938 A1 | * | 6/1988 |

* cited by examiner

Primary Examiner—Erma Cameron
(74) Attorney, Agent, or Firm—Heller Ehrman White & McAuliffe LLP

(57) ABSTRACT

Described is a process for protecting a metallic substrate against corrosion resulting in the formation of a species X, derived from the metal, wherein a coating composition based on (hetero)polysiloxanes prepared by hydrolysis and condensation processes is applied to the substrate and cured, and which is characterized in that the coating composition comprises at least one species Z which reacts or interacts with the metal to form a species Y having a more negative formation enthalpy than the species X.

20 Claims, No Drawings

METHOD FOR PROTECTING A METALLIC SUBSTRATE AGAINST CORROSION

The present invention relates to a process for protecting a metallic substrate against corrosion and in particular to a process wherein the formation of a possible corrosion product of the metal is substantially or completely prevented by a competing reaction or interaction of the metal with a species which leads to a product having a more negative formation enthalpy than the corrosion product.

Metals whose position in the voltage series means that they react with water may under certain circumstances require a protective coating that prevents attack by water and/or oxygen. For this purpose, the prior art includes a very wide variety of processes. Whereas, in the case of aluminium, anodic oxidation (Eloxal process) is a widespread process, it is difficult if not impossible in the case of magnesium. Another possibility for preventing attack on the surface of the metal is to prevent the permeation of the corrosion-causing species through the entire coat thickness of the coating material. For this purpose it is necessary to use coat thicknesses of 50 μm or more. In another known corrosion protection process, a porous sol-gel coat is applied to the substrate, is subsequently impregnated repeatedly with polymers, in this case silicones, and, owing to the high proportion of inorganic structure, provides a relatively good diffusion barrier. A disadvantage of this process, however, is the need for multiple impregnation. Consequently, a protection system of this kind becomes complex to operate and very expensive, and so the principle has not established itself in the market. In the case of ferrous metals, corrosion-inhibiting pigments are generally added.

It was therefore an object of the present invention to develop a (preferably transparent) coating system which provides effective corrosion protection for a very wide variety of metallic substrates, preferably in combination with a very high abrasion resistance.

In accordance with the invention it has been found that this object may be achieved by providing silicic acid (hetero)polycondensates with certain species which are able to enter into a bond or at least an interaction with the metal (ion) in the course of which the free interface enthalpy is lowered sufficiently, and by enclosing or anchoring this species firmly in the structure of the coating by means of an inorganic network. Owing to the inorganic network, the resultant coatings also possess high abrasion resistance, which may be strengthened further by incorporating nanoscale particles. Another effect of incorporating the nanoscale particles is that such coats remain transparent.

In contrast to the prior art, which necessitates phosphating or chromating as a passivation step in the case of conventional corrosion protection coatings, this step may be omitted if the species used in accordance with the invention are incorporated in molecularly disperse form into the (hetero)polysiloxane structure. Through a diffusion process, they reach the interface during the wet coating operation, and develop their stabilizing activities there. Consequently, these species also differ from the anti-corrosion pigments of the prior art. If the desire is not for transparent coats, then the systems (without a loss of their primary corrosion protection activity) may of course be formulated with additional pigments. A further (additional) possibility is the incorporation of fluorinated side-chains (via correspondingly hydrolysable silanes, for example), by means of which such coats provide a low surface energy at the same time.

The present invention accordingly provides a process for protecting a metallic substrate against corrosion resulting in the formation of a species X, derived from the metal, wherein a coating composition based on (hetero) polysiloxanes prepared by hydrolysis and condensation processes is applied to the substrate and cured, and which is characterized in that the coating composition comprises at least one species Z which reacts or interacts with the metal to form a species Y having a more negative formation enthalpy than the species X.

In the text below, the present invention is elucidated further, taking into account preferred embodiments thereof.

The term "corrosion" as used hereinbelow refers to any change in the metal which leads to oxidation (conversion) to the corresponding metal cation with formation of a species X. Such species X are generally (optionally hydrated) metal oxides, carbonates, sulphites, sulphates or else sulphides (for example, in the case of the action of $H_2S$ on Ag).

The term "metallic substrate" as used in the present description and claims refers to any substrate which consists entirely of metal or has at least one metallic layer on its surface.

In the present context, the terms "metal" and "metallic" embrace not only pure metals but also mixtures of metals and metal alloys, these metals and metal alloys preferably being susceptible to corrosion.

Accordingly, the process of the invention may be applied with particular advantage to metallic substrates comprising at least one metal from the group consisting of iron, aluminium, magnesium, zinc, silver and copper, although the scope of application of the present invention is not restricted to these metals. Among the metal alloys which may particularly profit from the present invention, mention may be made in particular of steel and brass and of aluminium alloys.

The coating composition based on (hetero)polysiloxanes prepared by hydrolysis and condensation processes that is used in accordance with he invention derives preferably from at least one hydrolysable silicon compound of the general formula (I)

$$R_{4-x}SiR'_x \qquad (I)$$

in which the radicals R, which may be identical or different (preferably identical), are hydrolytically eliminable radicals, preference being given to alkoxy (especially of 1 to 6 carbon atoms, such as methoxy, ethoxy, propoxy and butoxy), halogen (especially Cl and Br), hydrogen, acyloxy (preferably of 2 to 6 carbon atoms, such as acetoxy, for example) and $-NR''_2$ (in which the radicals R'', which may be identical or different, are preferably hydrogen or $C_{1-4}$ alkyl radicals) and particular preference being given to methoxy or ethoxy; R' is alkyl, alkenyl, aryl, alkylaryl, arylalkyl, arylalkenyl, alkenylaryl (preferably of in each case 1 to 12 and in particular 1 to 8 carbon atoms, and including cyclic forms), it being possible for these radicals. to be interrupted by oxygen, sulphur or nitrogen atoms or by the group -NR'' and to carry one or more substituents from the group consisting of halogens and substituted or unsubstituted amino, amide, carboxyl, mercapto, isocyanato, hydroxyl, alkoxy, alkoxycarbonyl, phosphoric acid, acryloxy, methacryloxy, alkenyl, epoxy and vinyl groups; and x is 1, 2 or 3 (preferably 1 or 2 and especially 1).

Particularly preferred silicon starting compounds are those of the above general formula (I) in which R is methoxy or ethoxy, x is 1 and R' is an alkyl radical (preferably of 2 to 6 and with particular preference 2 to 4 carbon atoms) which is substituted by a group comprising a grouping which is amenable to a polyaddition reaction (including addition polymerization) and/or polycondensation reaction.

With particular preference, this grouping amenable to a polyaddition and/or polycondensation reaction is an epoxy group.

Accordingly, R' in the above formula (I) is with particular preference an ω-glycidyloxy-$C_{2-6}$ alkyl radical, more preferably a γ-glycidyloxypropyl radical. Specific examples of particularly preferred silicon compounds, accordingly, are γ-glycidyloxypropyltrimethoxysilane and γ-glycidyloxypropyltriethoxysilane.

In addition to the above-described hydrolysable silicon compound(s), the (hetero)polysiloxanes for use in accordance with the invention may further derive from other hydrolysable silicon compounds (known to the person skilled in the art), for example those in which x in the above formula (I) is zero (e.g. tetraethoxysilane), and also from other hydrolysable compounds, especially those of elements from the group consisting of Ti, Zr, Al, B, Sn and V, and especially from aluminium, titanium and zirconium; however, it is preferred for such compounds (on a monomeric basis) to make up not more than 50 mol % of all (monomeric) hydrolysable compounds used.

Further (optional and preferred) components of the coating composition for use in accordance with the invention are described below.

In order to give the corrosion protection coat an even further improved abrasion resistance, the coating composition may comprise nanoscale particles. These nanoscale particles (which may also, if desired, have been surface-modified) comprise preferably those from the group consisting of the oxides, oxide hydrates and carbides of silicon, aluminium and boron and also the transition metals (especially Ti and Zr). These nanoscale particles have a size in the range from 1 to 100, preferably from 2 to 50 and with particular preference from 5 to 20 nm. In connection with the preparation of the coating composition, the nanoscale material may be used in the form of a powder, but is preferably used in the form of an aqueous or alcoholic sol. Particularly preferred nanoscale particles for use in the present invention are those of $SiO_2$, $TiO_2$, $ZrO_2$, AlOOH and $Al_2O_3$, and especially of $SiO_2$ and aluminium oxide (especially in the form of boehmite). These particulate materials are available commercially both as powders and as sols. Especially when value is placed on high scratch resistance properties, the nanoscale particles may be used in an amount of up to 50% by weight, based on the matrix solids content. In general, the nanoscale particle content, if they are incorporated into the composition for use in accordance with the invention, is in the range from 3 to 50, in particular from 5 to 40% by weight, based on the matrix solids content.

If the hydrolysable starting silane comprises at least one compound of the above general formula (I) in which R' has a grouping amenable to a polyaddition and/or polycondensation reaction, it may be advantageous to add to the coating composition an organic network former. In the case of an epoxy group as the grouping amenable to a polyaddition and/or polycondensation reaction, these organic network formers preferably comprise (aromatic) polyols or aliphatic and/or aromatic mono- and/or polyepoxides. Examples of aromatic polyols are polyphenylene ethers which carry hydroxyl groups on at least two of the phenyl rings, and also, generally, compounds (or oligomers) in which aromatic rings are connected to one another by a single bond, —O—, —CO—, —SO₂—, etc., and which have at least (and preferably) two hydroxyl groups attached to aromatic groups. Particularly preferred aromatic polyols are aromatic diols. Among these aromatic diols, particular preference is given to compounds with the general formulae (II) and (III):

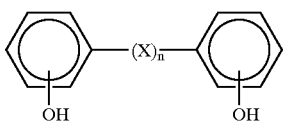

(II)

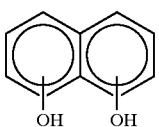

(III)

in which X is a $C_1-C_8$ alkylene or alkylidene radical, a $C_8-C_{14}$ arylene radical, —O—, —S—, —CO— or —SO₂— and n is 0 or 1. Preferred definitions of X in the formula (II) are $C_1-C_4$ alkylene or $C_1-C_4$ alkylidene, especially —C(CH₃)₂—, and —SO₂—. In the compounds of the formulae (II) and (III), the aromatic rings may in addition to the OH groups carry up to 4 or 3 further substituents, such as halogen, alkyl and alkoxy, for example.

Specific examples of the compounds of the formulae (II) and (III) are bisphenol A, bisphenol S and 1,5-dihydroxynaphthalene.

Particular preference among the aliphatic and aromatic mono- and polyepoxides is given to compounds of the general formulae (IV) to (VIII):

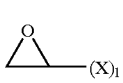

(IV)

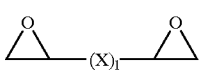

(V)

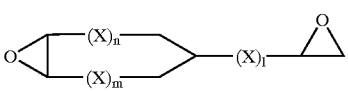

(VI)

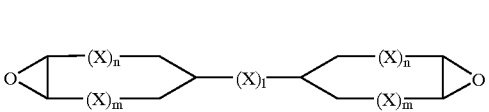

(VII)

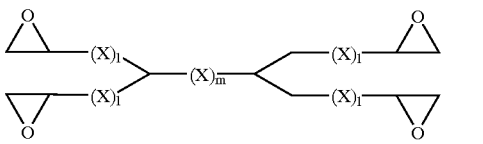

(VIII)

in which X is a $C_1-C_{20}$ alkylene or alkylidene radical, a $C_9-Cl_{14}$ arylene radical, or an alkenyl, aryl, alkylaryl, arylalkyl, arylalkenyl or alkenylaryl radical of up to 20, preferably up to 12 carbon atoms, it being possible for these radicals to be interrupted by oxygen, sulphur or nitrogen atoms or by the group -NR" (as defined above) and to carry one of more substituents from the group consisting of halogens and substituted or unsubstituted amino, amide, carboxyl, mercapto, isocyanato, hydroxyl, phosphoric acid, acryloxy, methacryloxy, alkenyl, epoxy and vinyl groups.

Specific examples of the compounds of the formulae (IV) to (VIII) are 2,3-epoxypropyl phenyl ether, 4-vinyl-1-cyclohexene diepoxide, 1,3-butadiene diepoxide, 2,2-dimethyl-1,3-propanediolbis(2,3-epoxypropyl ether) and bis{4-[bis(2,3-epoxypropyl)-amino]phenyl}methane.

Optionally (and preferably) the coating composition also incorporates an initiator for the organic crosslinking (provided that such crosslinking is possible on the basis of the starting compounds used). This initiator may comprise, for example, in the case of the above epoxy-containing compounds, an amine, a thiol, an acid anhydride or an isocyanate. Preferably it is an amine and in particular it is a nitrogen heterocycle.

Specific examples of the initiator are 1-methylimidazole, piperazine, ethanethiol, succinic anhydride and 4,4'-methylenebis(cyclohexyl isocyanate). As the starter it is also possible, however, to use a (preferably hydrolysable) amino-functional silane, an example being γ-aminopropyltri(m)ethoxysilane or N-(2-aminoethyl)-3-aminopropyltrimethoxysilane.

If the corrosion protection composition for use in accordance with the invention is additionally to be given hydrophobic, oleophobic and dirt-repelling properties, it is of advantage to supplement the abovementioned hydrolysable silanes with those possessing at least one non-hydrolysable radical which has 5 to 30 fluorine atoms attached to carbon atoms that are separated by at least two atoms from Si. Such silanes are described, for example, in DE-A-41 18 184. Specific examples thereof are the following:

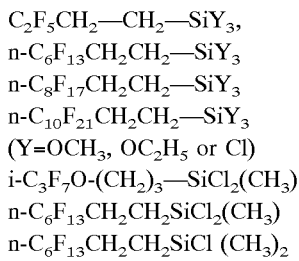

$C_2F_5CH_2$—$CH_2$—$SiY_3$, n-$C_6F_{13}CH_2CH_2$—$SiY_3$ n-$C_8F_{17}CH_2CH_2$—$SiY_3$ n-$C_{10}F_{21}CH_2CH_2$—$SiY_3$ (Y=$OCH_3$, $OC_2H_5$ or Cl)

i-$C_3F_7O$-$(CH_2)_3$—$SiCl_2(CH_3)$ n-$C_6F_{13}CH_2CH_2SiCl_2(CH_3)$ n-$C_6F_{13}CH_2CH_2SiCl$ $(CH_3)_2$

The species Z which is essential to the invention and must be incorporated in the present coating composition comprises a species which reacts or at least interacts with the metal (or metals) to be protected against corrosion and in so doing forms a species Y having a more negative formation enthalpy than the species X which would be expected to be the corrosion product of the metal (or metals) of the metallic substrate for treatment in accordance with the invention. In other words, the respective metals form a more thermodynamically stable compound with the species Z used in accordance with the invention than with the corrosion-causing species (e.g. oxygen, water, $H_2S$, etc.).

In accordance with the invention, the species Z may be attached either to the (hetero)polysiloxanes or to any other component of the coating composition (attached via a covalent bond, for example) or may be present merely in molecularly disperse form in the coating composition and enclosed in the inorganic skeleton in the course of the curing of this composition. Any other conceivable incorporation of the species Z in the coating composition is of course also possible, provided that direct contact of the species Z with the metal (or metal surface) and a reaction or interaction between metal and species Z forming the species Y are possible.

The species Y may comprise, for example, a complex compound or a low-solubility salt of the corresponding metal cations.

Merely by way of illustration, suitable compounds, for aluminium as species Y, for example, are aluminium silicates (Si—O—Al bonds), which generally have a lower free enthalpy than aluminium oxides (corrosion products= species X), but also phosphates and the like. Phosphates are particularly suitable for magnesium or iron substrates as well (in this case, with particular preference, in combination with zinc compounds).

Among the low-solubility salts, mention may be made, for example, of silver iodide and silver cyanide, mullite ($3Al_2O_3 \cdot 2SiO_2$), aluminium phosphate, iron sulphide (FeS), iron phosphate ($FePO_4$), etc., magnesium phosphate, magnesium ammonium phosphate, dolomite ($CaMg (CO_3)_2$), magnesium silicate ($MgSiO_3$), spinels ($MgAl_2O_4$), zinc phosphate ($Zn_3(PO_4)_2$), zinc silicate ($ZnSiO_3$), zinc sulphide, zinc arsenate ($Zn_3(AsO_4)_2$), aluminium zinc oxide ($ZnAl_2O_4$), etc.

Very generally, specific examples of suitable species Z which may alternatively function as a complex ligand, form insoluble compounds with metals or with metals form another, thermodynamically (more) stable compound—of whatever kind—are fluoro, chloro, bromo and iodo, hydroxo, oxo, peroxo, nitrito-O, tetrahydrofuran, cyanato, fulminato-O, thiocyanato, thio, disulphido, mercapto, mercaptobenzothiazole, trithione, ammine, amido, imido, ethylenediamine, diethylenetriamine, triethylenetetramine, nitrosyl, nitrito-N, cyano-N, nitrile, isocyanato, isothiocyanato, pyridine, α,α-bipyridyl, phenanthroline, trifluorophosphine, phosphane, phosphonato, phosphato, ammonium phosphato, ethylenediaminetetraacetate, acetylacetonate, arsenate, benzoate, carbonyls, cyanato-C, isonitrile and fulminato-C and also magnesium oxide, zinc and zinc oxide.

Among these species Z, particular preference is given to phosphate or phosphate-forming precursors and complexing agents such as isocyanates, amines, benzoates and also MgO, Zn and ZnO.

Of course, the choice of the species Z always depends on the specific metal to be protected and on the corresponding species X.

Tables 1 to 4 below (taken from Ishan Barin: "Thermochemical Data of Pure Substances", Knacke, Kubaschewski, Hesselmann: "Thermodynamical Properties of Inorganic Substances" and "Handbook of Chemistry and Physics") give an overview of the formation enthalpies and formation energies and of the solubility in hot water of certain species X and Y derived from Al, Mg, Zn and Fe.

TABLE 1

(T = 298 K)

| Compound name | Empirical formula | Formation enthalpy ΔH$_f$ [kJ/mol] | Formation energy ΔG$_f$ [kJ/mol] |
|---|---|---|---|
| Corundum | $Al_2O_3$ | −1676 | −1582 |
| Aluminium hydroxide (amorphous) | $Al(OH)_3$ | −1276 | −1139 |
| Boehmite | AlOOH (B) | −985 | — |
| Diaspore | AlOOH (D) | −1002 | — |
| Aluminium phosphate | $AlPO_4$ | −1733 | −1617 |
| Mullite | $3Al_2O_3 \cdot 2SiO_2$ | −6819 | −6443 |
| Andalusite | $Al_2O_3 \cdot SiO_2$ | −2590 | −2443 |
| Sillimanite | $Al_2O_3 \cdot SiO_2$ (S) | −2588 | −2441 |
| Kyanite | $Al_2O_3 \cdot SiO_2$ (K) | −2594 | −2444 |
| Metakaolinite | $Al_2O_3 \cdot 2SiO_2$ | −3341 | — |
| Kaolinite | $Al_2O_3 \cdot 2SiO_2 \cdot 2H_2O$ | −4120 | −3799 |

TABLE 2

(T = 298 K)

| Compound name | Empirical formula | Formation enthalpy $\Delta H_f$ [kJ/mol] | Formation energy $\Delta G_f$ [kJ/mol] | Solubility [g/cm$^3$] in hot water |
|---|---|---|---|---|
| Periclase | MgO | −601 | −569 | 0.0086 |
| Brucite | Mg(OH)$_2$ | −925 | −834 | 0.004 |
| Basic chloride | Mg(OH)Cl | −799 | −732 | — |
| Magnesium chromate | MgO.Cr$_2$O$_3$ | −1778 | — | insoluble |
| Magnesium phosphate | 3MgO.P$_2$O$_5$ | −3781 | −3539 | insoluble |
| Spinel | MgO.Al$_2$O$_3$ | −2299 | −2175 | insoluble in H$_2$SO$_4$, HNO$_3$ and dilute HCl |
| Chrysotile | Mg$_3$Si$_2$O$_5$(OH)$_4$ | −4366 | −4038 | — |
| Clinoenstatite | MgSiO$_3$ | −1548 | −1462 | insoluble |
| Anthophyllite | Mg$_7$Si$_8$O$_{22}$(OH)$_2$ | −12086 | −11367 | — |

TABLE 3

(T = 298 K)

| Compound name | Empirical formula | Formation enthalpy $\Delta H_f$ [kJ/mol] | Formation energy $\Delta G_f$ [kJ/mol] | Solubility [g/cm$^3$] in hot water |
|---|---|---|---|---|
| Zinc oxide | ZnO | −351 | −321 | insoluble |
| Zinc hydroxide | Zn(OH)$_2$ | −415 | — | sparingly soluble |
| Zinc phosphate | Zn$_3$(PO$_4$)$_2$ | −2900 | −2664 | insoluble |
| Willernite | 2ZnO.SiO$_2$ | −1645 | −1531 | insoluble |
| Aluminium zinc oxide | ZnO.Al$_2$O$_3$ | −2072 | — | — |
| Zinc silicate | Zn$_2$SiO$_4$ | −1644 | — | — |

TABLE 4

(T = 298 K)

| Compound name | Empirical formula | Formation enthalpy $\Delta H_f$ [kJ/mol] | Formation energy $\Delta G_f$ [kJ/mol] |
|---|---|---|---|
| Iron oxide (hematite) | Fe$_2$O$_3$ | −824 | −742 |
| Iron oxide (magnetite) | Fe$_3$O$_4$ | −1118 | −1015 |
| Iron silicate | Fe$_2$SiO$_4$ | −1480 | — |

From Table 1 it is evident that possible corrosion products of aluminium (the oxides) possess more positive formation enthalpies than, for example, aluminium phosphate or the aluminium silicates. This means that the possible corrosion products X have a lower thermodynamic stability than the species Y to be produced in accordance with the invention. This property is in principle also exploited in connection with the production of corrosion protection coatings based on anodically produced aluminium oxide layers by electrolytic processes (compare $\Delta H_f$ of corundum with $\Delta H_f$ of the other aluminium oxides). The advantage of the process of the invention, however, is that in this process it is possible to do away with the electric assistance of the process (the process is a chemically currentless process). Furthermore, especially with incorporation of nanoscale materials into the coating composition, it is possible to achieve highly effective protection against wear.

Table 2 also shows that possible corrosion products X of magnesium (oxides, basic chloride) exhibit quantitatively smaller formation enthalpies than, for example, phosphates, spinels and silicates (Y) of magnesium. A further factor is the lower solubility of the last-mentioned compounds in hot water and acids.

Similar conclusions may be drawn from Tables 3 and 4 in the case of zinc compounds and-iron compounds.

The composition for use in accordance with the invention is prepared in a manner customary in this field. Preferably, the hydrolysable silicon compound(s) of the above general formula (I) in which x is 1, 2 or 3 is (are) first of all hydrolysed (at room temperature), using generally from 0.25 to 3 mol and preferably from 0.5 to 1 mol of H$_2$O per mole of hydrolysable group, and preferably using a (preferably acidic) catalyst, with particular preference dilute phosphoric acid. This is followed, for example, by the addition of the other components in any order; if used, the initiator for the (preferred) organic crosslinking is preferably added at the end of the synthesis, since in certain cases it exerts an influence on the pot life of the coating composition in question.

Alternatively, when using nanoscale particles, the hydrolysis may take place in the presence of the nanoscale particles, for example.

If (inter alia) silicon compounds of the general formula (I) are used in which x is 0, then their hydrolysis may take place, for example, during the hydrolysis of the other silanes of the general formula (I) by hydrolysing the said silanes together under the abovementioned conditions. Preferably, however, it takes place separately from the hydrolysis of the other hydrolysable silanes, using between 0.25 and 3 mol, with particular preference from 0.5 to 1 mol of H$_2$O per mole of hydrolysable group and using mineral acids, preferably HCl, as hydrolysis catalyst.

In order to establish the rheological properties of the coating composition, inert solvents may be added, if desired, to the composition at any stage of the preparation (preferably, these solvents comprise alcohols which are liquid at room temperature—and which, moreover, are also formed during the hydrolysis of the silanes used with preference—and/or comprise ether alcohols which are liquid at room temperature).

Into the coating composition used in accordance with the invention it is also possible to incorporate the customary additives, such as, for example, colorants, levelling agents, UV stabilizers, photoinitiators, photosensitizers (if photochemical curing of the composition is intended) and thermal polymerization catalysts (examples being the abovementioned initiators for organic crosslinking).

The coating composition may be applied to metallic substrates by standard coating methods, such as dipping, spreading, brushing, knife coating, rolling, spraying, spin coating, screen printing and curtain coating, for example.

Immediately or after drying at room temperature beforehand (for partial removal of the solvent), curing is then carried out. Curing takes place preferably thermally at temperatures in the range from 50 to 300° C., in particular from 70 to 220° C. and with particular preference from 90 to 130° C.

The coating composition is applied to the metallic substrate preferably in dry coat thicknesses of from 1 to 50 $\mu$m, in particular from 2 to 20 $\mu$m and with particular preference from 5 to 10 $\mu$m.

In addition to high transparency, the coatings applied in accordance with the invention are notable in particular for very high scratch resistance (further intensified by the use of nanoscale particles), dirt-repelling properties (in the case where fluorinated silanes are used additionally) and excellent corrosion-inhibiting properties. Mention should be made in particular of the fact that the metal surface to be coated need only be cleaned (degreased). There is no need to use adhesion promoters, such as chromate or phosphate coats, for example.

Specific fields of application and examples of the use of the present invention include the following:

construction, e.g. support and shuttering material made of steel, face supports, pit props, tunnel and shaft lining constructions, insulating construction elements, composite sheets comprising two metal profile sheets and an insulating metal layer, shutters, framework constructions, roof structures, fittings and supply conduits, steel protection boards, street lighting and street signage, sliding and rolling lattice gratings, gates, doors, windows and their frames and panels, gate seals or door seals made of steel or aluminium, fire doors, tanks, collecting vessels, drums, vats and similar containers made of iron, steel or aluminium, heating boilers, radiators, steam boilers, halls with and without internals, buildings, garages, garden houses, facings made of sheet steel or aluminium, profiles for facings, window frames, facing elements, zinc roofs;

vehicles, e.g. body parts of cars, lorries and trucks made of magnesium, road vehicles comprising and including aluminium, electrical articles, rims, wheels made of aluminium (including chrome-plated) or magnesium, engines, drive elements for road vehicles, especially shafts and bearing shells, impregnation of porous diecast components, aircraft, marine screw propellers, boats, nameplates and identification plates;

household and office articles, e.g. furniture made of steel, aluminium, nickel-silver or copper, shelving units, sanitary installations, kitchen equipment, lighting elements (lamps or lights), solar installations, locks, fittings, door and window handles, cookware, fryware and bakeware, letterboxes and box-like constructions, reinforced cabinets, strongboxes, sorting, filing and file-card boxes, pen trays, stamp holders, front plates, screens, identification plates, scales;

articles of everyday use, e.g. tabacco tins, cigarette cases, compacts, lipstick cases, weapons, e.g. knives and guns, handles and blades for knives or shears and scissor blades, tools, e.g. spanners, pliers and screwdrivers, screws, nails, metal mesh, springs, chains, iron or steel wool and scourers, buckles, rivets, cutting products, e.g. shavers, razors and razor blades, spectacle frames made of magnesium, cutlery, spades, shovels, hoes, axes, cleavers, musical instruments, clock and watch hands, jewellery and rings, tweezers, clips, hooks, eyes, grinding balls, bins and drainage grilles, hose and pipe clips, sports equipment, e.g. screw-in studs and goal frames.

Coatings for enhancing the corrosion resistance are suitable, for example, for iron and steel products, especially profiles, strips, plates, sheets, coils, wires and pipes made of iron, of unalloyed, stainless or otherwise-alloyed steel, either bright, zinc-plated or otherwise-plated, semifinished forged goods made of unalloyed, stainless or other alloyed steel; aluminium, especially foils, thin strips, sheets, plates, diecastings, wrought aluminium, or pressed, punched or drawn parts; metallic coatings produced by casting or by electrolytic or chemical processes; and metal surfaces enhanced by coating, glazing or anodic oxidation.

Coatings for enhancing the wear resistance are suitable, for example, for jewellery, timepieces and parts thereof, and rings made of gold and platinum.

Diffusion barrier layers are suitable, for example, for lead fishing weights, diffusion barriers on stainless steel to prevent heavy metal contamination, water pipes, tools containing nickel or cobalt, or jewellery (anti-allergenic).

Surface levelling/frictional wear reducing coats are suitable, for example, for seals, gaskets or guide rings.

The examples which follow serve to illustrate the present invention without, however, restricting its scope.

EXAMPLE 1 a) Preparation of the Coating Sol 236.35 g of γ-glycidyloxypropyltrimethoxysilane (GPTMS hereinbelow) were charged to a 1000 ml two-necked flask and admixed with 54.0 g of 0.1 M orthophosphoric acid ($H_3PO_4$) with stirring. The reaction mixture was stirred at room temperature overnight (14 hours). Following subsequent addition of 97.21 g of $SiO_2$ sol (IPA-ST, available from Nissan Chemical Industries, Limited; 30% by weight in 2-propanol, particle size: 10 nm) stirring was continued at room temperature for 10 minutes. The mixture was transferred to a 2000 ml glass bottle, after which a solution of 91.31 g of bisphenol A (BPA) in 437.5 g of isopropoxyethanol (IPE) was added to the hydrolysis product and stirring was continued for a further 10 minutes. Subsequently, 2.05 g of 1-methylimidazole (MI) and 8.97 g of 3-aminopropyltrimethoxysilane (APTS) were added dropwise with stirring. The viscosities of the coating sols were between 8 and 25 mPa·s.

b) Degreasing of the Metals

The surface of aluminium structural components (AlSi12) was degreased at 50° C. with an alkaline cleaner containing surfactant (P3-Almeco 18®, from Henkel, 3% strength aqueous solution). The structural components were immersed in a bath of the cleaning product for 3 minutes and then rinsed off under running deionized water (duration: 1 minute). Subsequently, the components were dried in a convection oven (70° C.) for 10 minutes.

c) Application of the Coating Sol

The degreased substrates (cf. b)) were immersed in the coating sol. After 1 minute they were removed, and excess coating material was removed from the metal surface by spinning. The coatings were subsequently cured by storage in a convection oven (180° C.) for 30 minutes. The transparent coats exhibited excellent adhesion at coat thicknesses between 7 and 30 μm. The coated specimens were subjected to the salt spray climate (DIN 50021, CASS). After 120 hours of exposure there was no surface damage; the scribe creep was less than 1 mm.

EXAMPLE 2 a) Preparation of the Coating Sol 23.64 g of GPTMS were charged to a flask and a solution of 7.8 mg of sodium benzoate in 7.7 g of silica sol (200S, from Bayer, 30% by weight in water; particle size: 7–8 nm) was added with stirring. The initially cloudy two-phase mixture was stirred at room temperature for 5 hours, after which a mixture of 9.13 g of BPA in 9.2 g of ethanol was added and the combined mixture was stirred for a further 18 hours. Subsequently, 0.41 g of MI was added and stirring was continued for 40 minutes. The resulting transparent sol had a pot life of more than 6 days.

b) Application of the Coating Sol

Aluminium panels (Al 99.5) were degreased as described under 1 b), the specimens being additionally immersed, however, directly following immersion in the alkaline bath, in 20% strength nitric acid for 10 seconds. The coating was applied to the metal panels by the dip technique, using a drawing speed of 5 mm/s. Curing took place at 130° C. for a period of 60 minutes. The dry thickness of the coat was approximately 9 μm. After 240 hours of exposure in the salt spray mist climate (CASS) there was no surface damage; the scribe creep was less than 0.4 mm. Coatings produced analogously on steel (ST 37) withstood exposure in the CASS for 120 hours without occurrence of corrosion.

EXAMPLE 3 a) Preparation of the Coating Sol 5.4 g of 0.1 N HCl were introduced into 47.2 g of GPTMS and the mixture was stirred at room temperature for 2 hours. Subsequently, 18.26 g of BPA were dissolved in 40 g of ethanol and 20 g of butyl glycol and added to the prehydrolysate. Following the addition of 22.7 g of MgO, glass beads were added to the sol which was then shaken in a plastic bottle (Red Devil; dispersing of the MgO). Finally, 3.58 g of APTS were added with stirring. Following the addition of the APTS, the pot life is at least one hour.

b) Application of the Coating Sol

Magnesium structural components (AZ91, AM50) were degreased as described above under 1 b). The sol prepared as above was supplied to the components using a commercial coating gun (SATA-Jet). Curing took place in a convection oven (170° C.) for a period of 30 minutes. Some of the coated samples were subsequently pierced with a steel nail such that half of the nail remained in the components. This was done in order to simulate contact corrosion within the salt spray mist test (CASS) exposure. After a 48-hour exposure period, no corrosion damage was observed on the metal surface. The creep from the steel nail was less than 1 mm.

EXAMPLE 4 a) Preparation of the Particulate Sol 37.3 g of tetraethoxysilane (TEOS) and 23.3 g of $SiO_2$ sol (Bayer silica sol 300/30) were added at room temperature and with stirring to 119.3 g of methyltriethoxysilane (MTEOS). The silanes were hydrolysed by adding 23.3 g of double-distilled water and slow dropwise addition of 1.2 g of concentrated hydrochloric acid with thorough stirring. During this reaction, large amounts of heat were given off and the clear colourless sol was observed to show a changeover point through milky white and back to colourless.

b) Preparation of the Matrix 236.3 g of GPTMS were prehydrolysed at room temperature by adding 27 g of (0.1 M) $H_3PO_4$.

c) Preparation of the Coating Sol 50.06 g of 2,2'-bis(4-hydroxyphenyl) sulphone (bisphenol S, BPS hereinbelow), dissolved in 68.5 g of ethanol and 68.5 g of butyl glycol, were added to the GPTMS prehydrolysate. Following addition of the particulate sol (see a)) a transparent colourless coating sol was formed for whose organic crosslinking 1.64 g of MI were added as initiator.

d) Application of the Coating Sol

The coating sol prepared above under c) was applied by standard coating techniques (e.g. spin or dip coating) to metal surfaces (aluminium, zinc, magnesium, silver; degreased as in 1 b)). The sol was cured by heat treatment at 130° C. (curing time: 1 h). This gave coat thicknesses of between 5 and 20 μm. Coated zinc structural components were subjected to salt spray mist tests (DIN 50021, SS). Following an exposure period of 48 hours, there was no corrosion damage. The thermal cycling stability of these specimens was tested between −40° C. and 100° C.; after 200 cycles, there was no damage in the coating. Following a storage period of 120 hours under humid conditions (95° C., 95% RH), the zinc substrates showed no damage. Coated silver specimens withstood storage periods of 48 hours in an $H_2S$ atmosphere without tarnishing.

EXAMPLE 5 a) Preparation of the Matrix 94 g of 0.01 M HCl were added to 1524 g of γ-glycidyloxypropyltriethoxysilane (GPTES) in a 2000 ml round-bottom flask and the mixture was stirred initially at room temperature for 4 hours. The two-phase reaction mixture was subsequently heated at reflux and stirred at approximately 100° C. for a further 2.5 hours. The resulting single-phase mixture was cooled to room temperature, transferred to a 5 l glass bottle and admixed in succession with 1000 g of $SiO_2$ sol (IPA-ST) and 2.5 g of tetrahexylammonium hydroxide (THAH).

b) Preparation of the Coating Sol 3.24 g of 2,2-dimethyl-1,3-propanediol bis(2,3-epoxypropyl ether) and 0.28 g of piperazine (as initiator) were added to 14.76 g of the sol prepared above under a). 10 g of ethanol and 10 g of isopropoxyethanol were added to the resulting mixture which was subsequently stirred at room temperature for 30 minutes.

c) Application of the Coating Sol

Aluminium panels (Al 99.5) were degreased as described above under 1 b). The coating was applied to the metal panels by the dip method with a draining rate of 5 mm/s. Curing took place over a period of 2 hours at 130° C. The coat thicknesses were approximately 7 μm. After 500 hours of UV exposure in the sun test, the colourless transparent coats showed no absorption losses in the visible wavelength range. The scoring hardness of the coatings was 50 g (modified Erichsen test). After 120 hours of exposure in a salt spray mist climate (CASS), there was no surface damage. The scribe creep was less than 1.0 mm.

We claim:

1. A process for protecting a metallic substrate against corrosion resulting from the formation of at least one species X derived from at least one metal of the metallic substrate, the process comprising the steps of:
   (a) coating the metal with a coating composition comprising:
      (i) at least one polysiloxane or heteropolysiloxane prepared by hydrolysis and condensation of at least one hydrolyzable silane, and (ii) at least one species Z that forms a species Y derived from at least one metal of the metallic substrate and having a more negative formation enthalpy than the species X; and (b) curing the composition to form an inorganic network enclosing and/or anchoring the species Z.

2. The process of claim 1 where the metallic substrate comprises at least one metal selected from the group consisting of iron, aluminum, magnesium, zinc, silver, and copper.

3. The process of claim 1 where the metallic substrate comprises a metal alloy.

4. The process of claim 3 where the metal alloy is selected from the group consisting of steels, brasses, and aluminum alloys.

5. The process of claim 1 where the species X comprises an optionally hydrated oxide or a sulfide.

6. The process of claim 1 where the at least one polysiloxane or heteropolysiloxane is derived from at least one hydrolyzable silane having at least one radical comprising a group capable of one or both of a polyaddition reaction and a polycondensation reaction, the radical being attached to a silicon atom of the silane by an Si—C bond, and the step of curing the composition includes one or both of polyaddition and polycondensation of the group.

7. The process of claim 6 where the group is an epoxy group.

8. The process of claim 7 where the radical is an ω-glycidyloxy-($C_{2-6}$ alkyl) radical.

9. The process of claim 8 where the radical is a γ-glycidyloxypropyl radical.

10. The process of claim 1 where the coating composition further comprises nanoscale particles having a particle size between 1 and 100 nm selected from the group consisting of the oxides, hydrated oxides, and carbides of silicon, aluminum, boron, and the transition metals.

11. The process of claim 10 where the nanoscale particles are selected from the group consisting of the oxides of silicon and aluminum.

12. The process of claim 1 where the species Z is selected from the group consisting of species capable of formation of a complex of at least one metal of the metallic substrate or a salt of at least one metal of the metallic substrate having a lower solubility in hot water than species X.

13. The process of claim 1 where the species Z is selected from the group consisting of phosphates, phosphate precursors, isocyanates, amines, benzoates, MgO, Zn, and ZnO.

14. The process of claim 1 where the coating composition is applied in a thickness sufficient to yield a dry thickness of between 1 and 50 $\mu$m.

15. The process of claim 14 where the dry thickness is between 5 and 10 $\mu$m.

16. The process of claim 1 where the coating composition is thermally cured.

17. The process of claim 16 where the coating composition is thermally cured at a temperature between 50 and 300° C.

18. A corrosion-protected metallic substrate prepared by the process of claim 1.

19. The process of claim 1 where the species Z is selected from the group consisting of species capable of formation of silver iodide, silver cyanide, mullite, aluminum phosphate, ferrous sulfide, ferrous phosphate, magnesium phosphate, magnesium ammonium phosphate, dolomite, magnesium silicate, spinel, zinc phosphate, zinc silicate, zinc sulfide, zinc arsenate, and aluminum zinc oxide.

20. A coating composition for protecting a metallic substrate against corrosion resulting from the formation of at least one species X derived from at least one metal of the metallic substrate, the coating composition comprising:

(i) at least one polysiloxane or heteropolysiloxane prepared by hydrolysis and condensation of at least one hydrolyzable silane; and (ii) at least one species Z that forms a species Y derived from at least one metal of the metallic substrate and having a more negative formation enthalpy than the species X, the coating composition being curable to form an inorganic network enclosing and/or anchoring the species Z.

* * * * *